United States Patent [19]

Stenger et al.

[11] Patent Number: 4,605,156

[45] Date of Patent: Aug. 12, 1986

[54] COLD WELDED JOINT

[75] Inventors: Donald D. Stenger, San Diego, Calif.; John F. Coulahan, Bridgewater, N.J.

[73] Assignee: General Dynamics Corporation/Convair Div., San Diego, Calif.

[21] Appl. No.: 705,248

[22] Filed: Feb. 25, 1985

[51] Int. Cl.[4] .................... B21D 39/04; F16L 53/00; F16L 55/00

[52] U.S. Cl. ..................................... 228/127; 285/21; 285/41; 285/287

[58] Field of Search ............... 228/127; 285/21, 41, 285/294, 287, 93; 29/447

[56] References Cited

U.S. PATENT DOCUMENTS

| | | | |
|---|---|---|---|
| 1,838,249 | 12/1931 | Brown | 285/21 |
| 2,142,357 | 1/1939 | Jacobson | 285/287 |
| 3,668,754 | 6/1972 | Boast | 29/447 |
| 4,022,205 | 5/1977 | Tenczar | 285/21 |
| 4,035,007 | 7/1977 | Harrison et al. | 29/447 |
| 4,286,898 | 9/1981 | Stafford | 285/41 |
| 4,394,953 | 7/1983 | Sonnweber et al. | 228/263.12 |
| 4,486,037 | 12/1984 | Shotbolt | 285/93 |

FOREIGN PATENT DOCUMENTS

| | | | |
|---|---|---|---|
| 2173 | 1/1971 | Japan | 228/127 |
| 399221 | 10/1983 | United Kingdom | 285/287 |

Primary Examiner—Nicholas P. Godici
Assistant Examiner—Samuel M. Heinrich
Attorney, Agent, or Firm—John R. Duncan; Frank D. Gilliam

[57] ABSTRACT

Disclosed is a method and apparatus for forming a cold weld joint between parts comprising a sleeve (or coupling) to receive the ends of conductors (or pipes). The sleeve is provided with weld pads which when the sleeve cools will engage one of the conductors and be cold welded thereto by the forces of shrink fit. Serrations are provided for axial strength of the joint and to limit the plastic flow of the material of the pads. A second conductor is loosely telescoped in the sleeve by bellows for compensating for any misalignment when the parts are initially brought together. Later the bellows is provided with a backing material to rigidly connect the second conductor to the sleeve.

10 Claims, 3 Drawing Figures

COLD WELDED JOINT

BACKGROUND OF THE INVENTION

This invention relates to the formation of a joint between two parts, such as pipes or conduits, by a cold weld process utilizing the forces of shrink fit to create stresses, in excess of yield of the material, acting on small area pads to cold weld the parts together.

This invention also provides a means for compensating for misalignment of the parts as they are initially brought together by the use of bellows. Later, the bellows is provided with a backing material which gives strength and rigidity to that part of the joint.

Finally, this invention teaches how this joint can be made up and disconnected at a location remote from an operator.

The formation of interference fits between metal parts is a technique which has been practiced for many years. This technique utilizes a heating or cooling of one of the parts to form the shrink fit and are shown by way of example in the U.S. Patents to Harrison et al., U.S. Pat. No. 4,035,007, and U.S. Pat. No. 4,198,007, where a coupling is heated and cooled to permit the pipe ends to be installed and removed; in the U.S. Pat. No. 3,579,805 to Kast where an interference fit is formed by heat treatment; in the U.S. Pat. No. 3,469,862 to Conibeer where liquid metal leaks through telescoping parts and is frozen to seal the parts together. In the Patent to Conibeer, bellows are also used to contain an inert gas which freezes the parts, and bellows are also used in the U.S. Pat. No. 3,705,734 to Rajakovics.

However, it will be apparent to those skilled in the art from the drawings and the written disclosure of this invention hereinafter that the prior art does not disclose a cold weld joint and the method of forming same using the forces of shrink fit; the prior art does not show the use of bellows as a means for compensating for misalignment; nor does the prior art show how a joint can be made up and disconnected at a remote location.

SUMMARY OF THE INVENTION

Briefly, this invention utilizes the forces of shrink fit to cold weld one end of a metal part, such as a pipe or conductor, to as second coaxial metal part, such as a pipe or conductor, together with means for compensating for misalignment of the two coaxial parts as they are initially joined together.

A coupling or sleeve is provided with bellows which loosely couple one of the metal parts to the coupling to compensate for any misalignment of the parts when the second part is telescoped into the coupling. This bellows also forms a cavity within the coupling which is later filled with backing material to transmit the loading from the bellows to the stronger, more rigid parts. The other end of the coupling is provided with a pair of radially inwardly extending weld pads located within the spaced apart serrations which mate with serrations on the second metal part when the second metal part is telescoped within the coupling. The coupling is heated to increase its diameter to allow the second metal part to be telescoped within and then allowed to cool and shrink such that the serrations become clamped together and the weld pads undergo plastic flow to cold weld the sleeve and the second part together. The serrations limit the flow of the metal forming the cold weld and provide axial strength in the joint.

After the cold weld is formed the backing material is introduced into the cavity formed by the bellows. Means are also provided to determine when the cavity is filled and the seal formed by cold weld is tight.

In a second embodiment of this invention, the weld pads are made of copper and the mating surface area is copper plated. The copper allows a larger interference fit and disconnection of the joint may be accomplished by heating to soften and liquefy the copper bond.

The parts at the cold weld are disconnected by heating the sleeve and cooling the second metal part to rip apart the cold weld by failure in tension.

DETAILED DESCRIPTION OF THE DRAWINGS

Figure 1:
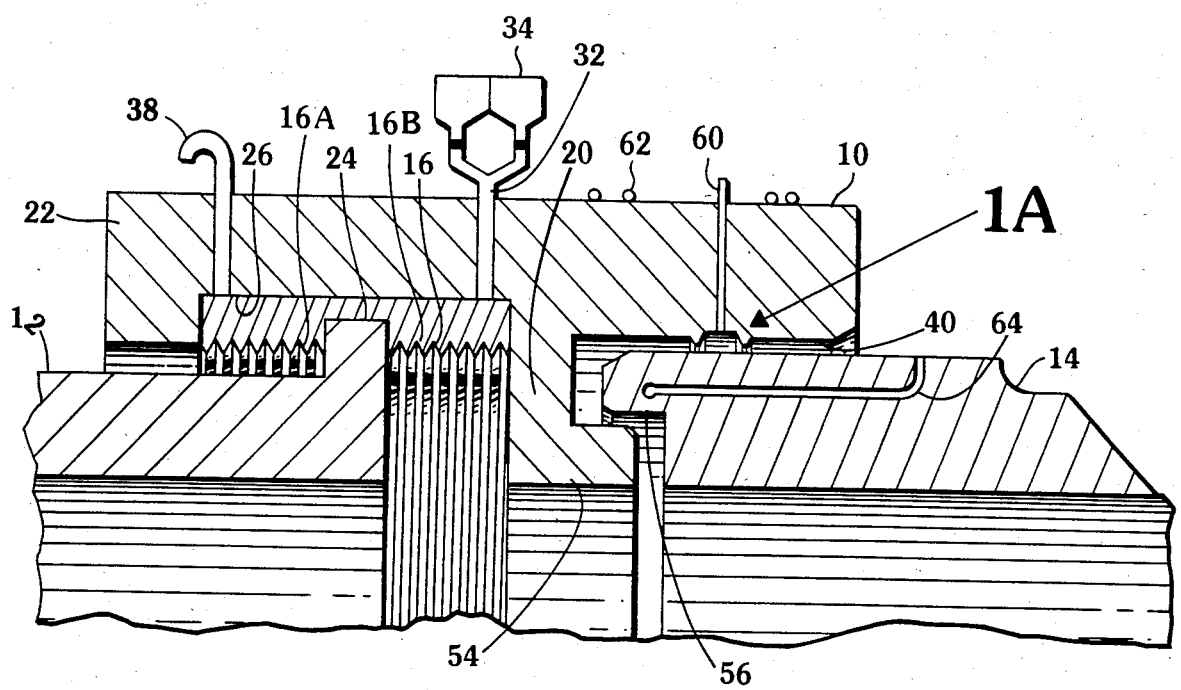
FIG. 1 is a cross-sectional view of a section of the joint incorporating this invention.
Figure 1A:
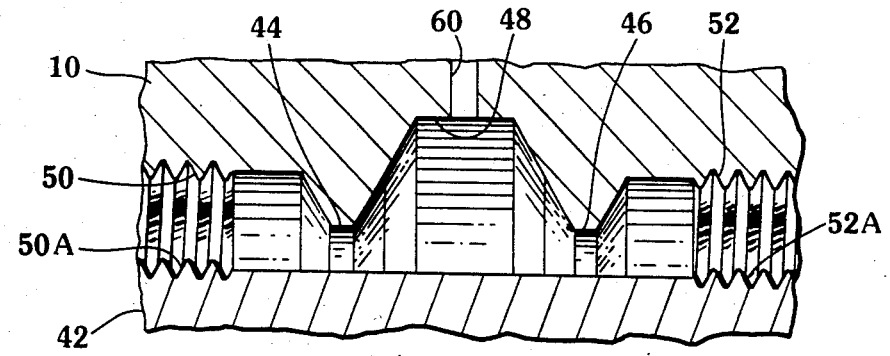
FIG. 1a is an enlarged detailed portion of the weld pads and the mating surface area in the area designated 1a in FIG. 1.

In FIGS. 1 and 1a of the drawings there are three main elements—an outer coupling or sleeve 10 to receive the ends of two pipes or conductors 12 and 14 in telescoping relationship with the two conductors in substantially axial alignment. As will be clear from the description hereinafter, two of these elements, coupling 10 and conductor 12, are initially connected in a loose manner via a bellows 16 to compensate for misalignment as a third element, conductor 14, is telescoped onto the coupling 10. The coupling, pipes and bellows may be selected from a number of metals which are somewhat corrosive resistant, such as steel.

The coupling 10 is cylindrical and is provided substantially midway thereof with a flange 20, L shaped in cross-section, which extends radially inwardly to a depth substantially coextensive with the bores (ID) of the inner walls of the two conductors. On the left end (as shown in the drawing) the coupling 10 is provided with a radially inwardly extending flange 22 whose inner diameter is greater than the outer diameter of conductor 12 which is telescoped within the coupling. The bellows 16 is actually in two parts, 16a and 16b, with part 16a attached at one end to flange 22 and at its other end to a radially outwardly extending flange 24 on conductor 12. The outer diameter of flange 24 is less than the inner diameter of the wall 26 of the coupling. The second bellows part 16b acts as a continuation of the first bellows part and is attached to a flange 24 on the side opposite bellows part 16a and to the central flange 20. This second bellows part 16b is substantially coextensive with the bellows part 16a and is generally parallel to the inner wall 26 and spaced therefrom and together with part of flange 22 and flange 20 form a cavity. This cavity is connected via a passage 32 to a reservoir 34 containing a liquid which is pumped into the cavity, after the cold weld is formed, where the liquid will later harden. The reservoir is shown with two containers for liquids that are mixed at the passage 32. The purpose of this hardened liquid is to form a backing material which transmits the loading from the relatively weak flexible bellows to the stronger rigid members by compression only. Compression loading of the backing material with axial forces present in the joint is ensured by flange 22 having a smaller inner diameter than the outer diameter of flange 24 on conductor 12. Also, loads in all other directions in the joint will compression load the backing material in some segment of the 360° circumference. The backing material does not have to adhere to the conduit/sleeve since tensile and shear forces do not have to be sustained by the backing material regardless of the piping system loads that may have to be transmitted by the joint. A material such as a concrete mixture, a plastic and/or ceramic resin is suggested by way of example. If a metal backing material is desired, a metal with a melting point lower than the other metal parts of the joint would be heated, pumped in and allowed to solidify.

To permit the filling of the cavity, the cavity is vented externally by a second passage 38 which is also used to determine if the cavity is properly filled by the appearance of the liquid at the end of this passage. The bellows, the cavity and the spacing of the conductor 12 from the coupling compensate for any misalignment between the parts when initially telescoped together.

Thus, as stated before, the liquid is pumped into the cavity after the cold weld of the joint is formed so that the misalignment, if any, has occurred before the liquid in the cavity solidifies.

The diameter of the inner wall 40 on the end of coupling 10 (to the right as shown in the drawing) is only slightly less than the outer diameter of the conductor 14 providing a slight interference fit there with—see arrows 42 in FIG. 1a) and is provided with a pair of the spaced apart inwardly directed concentric weld pads or rings 44 and 46. These weld pads are frustoconical in cross section, in the area adjacent the conductor 14 and provide a heavy interference fit with the conductor outer diameter. These pads extend circumferentially around the inner wall of the coupling and define a recess area 48. The base of this area has a larger inner diameter than the inner diameter of the wall 40 and provides an area where the material of the weld pads undergoing plastic flow can accumulate. Spaced apart raised serrations 50 and 52 are formed on the wall 40 outside the weld pads which will engage similarly situated flush serrations 50a and 52a on the outer surface of the second conductor 14. These latter serrations will be coextensive when the second conductor 14 is properly inserted in telescoping relationship in the coupling 10 and limit the loading and plastic flow of the weld pads as well as providing axial strength in the joint. The area of the conductor 14 between the serrations is called the mating surface area. The axially extending shoulder or tip 54 on the centrally located L shaped flange 20 is received within an annular recess 56 on the end of the second conductor when the latter is inserted in the coupling. The spacing between the shoulder 54 and recess 56 is a clearance fit, the magnitude of which is dependent upon thermal expansion characteristics. The clearance must be great enough to ensure a clearance remains between the shoulder 54 and recess 56 at the designated temperature differential but small enough to maintain concentricity between the coupling 10 and conductor 14 when the joint is disconnected. Of course the shoulder 54, the end of the conductor 14 and the end of the sleeve are suitably chamfered to facilitate insertion of the conductor into the coupling.

To test the seal formed by pads after assembly of the joint by applying fluid (gas or liquid) pressure to the recess area 48 via the passage (tube) 60. The pressure can be applied and then a valve (not shown) closed to see if the pressure drops due to a leak in the pads. This is called a drop test, a different pressure test would be to hold a steady pressure in the recess area 48 and determine if any flow rate is maintained in the tube 60.

Figure 2:
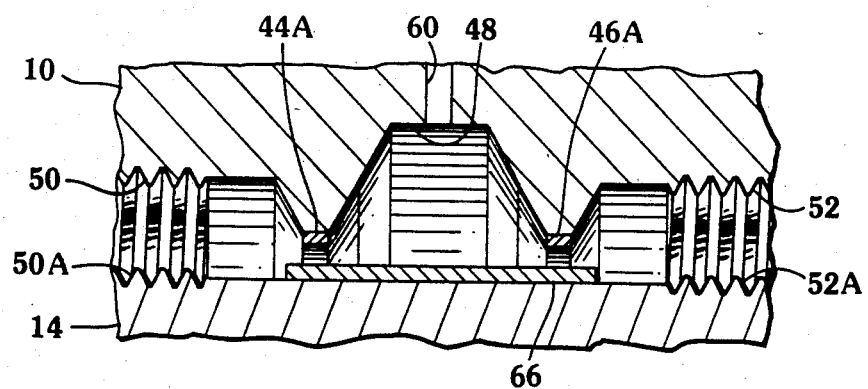
FIG. 2 is like FIG. 1a but shows the use of copper weld pads and copper plating on the mating surface area.

In the second embodiment of this invention as shown in FIG. 2, the weld pads are similar in shape to the weld pads of FIG. 1a but made of copper as illustrated at 44a and 46a. Also the mating surface area between the serrations 50a and 52a is copper plated as illustrated at 66. If copper pads are used the forces generated by the interference fit can be less than that where the weld pads are of the same base material that has a higher yield strength. Also, when a disconnection of the joint is made, heating of the copper will soften or liquefy the copper bond. In this embodiment, less force is needed to cold weld and less force is needed to disconnect the joint.

From the foregoing, it can be seen that first conductor 12 is connected to the left and of the coupling 10 by the attachment of the bellows 16 which allows movement between these two parts. The coils 62 then are energized and the conductor 14 is telescoped within the right end of the coupling. The coils are then de-energized and the sleeve begins to cool and shrink and force the weld pads together to become cold welded by the forces of shrink fit causing a plastic flow of the pads onto the mating surface area between the serrations. At this time too, the mating serrations become clamped together. Next, the annulus that remains in the recess area 48 may be tested to see that the seal between the coupling 10 and the conductor 14 is tight and, if so, the next step is to pump the liquid material from the reservoir 34 into the cavity sufficient to fill the cavity and to cause a flow through the passage 38. When the material appears in passage 38, the remote operator will know that the cavity is filled. Thereafter, the liquid in the cavity is allowed to harden.

To disconnect the coupling the heat is applied to the sleeve and the conductor 14 is cooled thereby ripping apart the cold weld by tension.

What is claimed is:

1. A cold weld joint formed by forces of shrink fit comprising:
   a cylindrical hollow coupling member for receiving two conductors, and inner surface of said coupling member being provided with weld pads,
   a first conductor having a mating surface area which is brought into telescoping relationship with said pads,
   restricting means in said coupling member and said first conductor to limit the flow of the material of said weld pads,
   means on said coupling to heat said coupling to increase its diameter to allow said first conductor to be telescoped within said coupling member, said coupling upon cooling causes the material of the weld pads to flow and engage said first conductor by the force of shrink fit to form a cold weld between the coupling and the first conductor,
   a bellows, and
   a second conductor in telescoping relationship with the coupling member and connected thereto by said bellows which provides compensation for misalignment of the coupling member and conductors when initially brought together.

2. The cold weld joint of claim 1 wherein said restricting means on said coupling member and said first conductor to limit the flow of the material of said weld pads are spaced apart serrations on said coupling member on each side of said weld pads and serrations on the outer surface of said conductor which are spaced the same distance on the serrations on said coupling and engage the latter serrations when the cold weld is formed.

3. The cold weld joint of claim 2 further including a recess in the end of said first conductor and a lip on the coupling member which interengage when the first conductor is received in said coupling member.

4. The cold weld joint of claim 2 wherein said weld pads are spaced apart and form a recess area for receiving the flow of material when the cold weld is formed.

5. The cold weld joint of claim 4 further including means communicating with said recess area whereby the tightness of the seal formed by the cold weld can be tested.

6. The cold weld joint of claim 5 wherein said bellows define a cavity and further including a reservoir of material which material is forced into said cavity to add rigidity to the connection between the coupling member and second conductor.

7. A cold weld joint formed by forces of shrink fit comprising:
   a cylindrical bored coupling member for receiving two conductors, the bore in said coupling member being provided with cold weld pads and spaced apart raised serrations,
   a first conductor having flush serrations on its outer diameter spaced apart distance coextensive with the serrations on said coupling to form a mating surface are therebetween which is brought into telescoping relationship with said cold weld pads,
   heating coils on the outer surface of said coupling to cause said weld pads to increase in diameter to enable telescoping of first conductor as a step in joint assembly and disassembly process; and
   a second conductor in telescoping relationship with the coupling and connected thereto by bellows alignment means which provide compensation for misalignment of the parts when initially brought together.

8. In the method of forming a cold weld joint between metal parts, the steps comprising:
   forming weld pads on the inner bore of a sleeve;
   forming a conductor with an outer diameter which forms an interference fit with the weld pads when inserted in said sleeve;
   forming means on said sleeve and said conductor which cooperate to clamp said conductor in the sleeve and to limit the flow of material from said weld pads and to form a mating surface area for said weld pads;
   heating said sleeve so that said weld pads form a clearance to allow telescoping in and out of said conductor;
   inserting said conductor into said sleeve;
   providing a bellows alignment means; and
   providing a second conductor in loose telescoping relationship with the coupling and connected thereto by said bellows alignment means.

9. The method as claimed in claim 8 wherein said means on said sleeve and conductor are mating serrations.

10. The method as claimed in claim 9 further including the step of providing the second conductor and sleeve at the area of telescoping relationship with a backing material to provide a rigid connection between the second conductor and the sleeve.

* * * * *